(12) United States Patent
Min et al.

(10) Patent No.: US 11,506,277 B2
(45) Date of Patent: *Nov. 22, 2022

(54) ANTI-THEFT DEVICE FOR VEHICLE

(71) Applicants: HYUNDAI MOTOR COMPANY, Seoul (KR); KIA MOTORS CORPORATION, Seoul (KR)

(72) Inventors: Jeong Seon Min, Suwon-si (KR); Min Gi Song, Seoul (KR); Chang Hyun Lee, Seoul (KR); Sun Il Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

This patent is subject to a terminal disclaimer.

(21) Appl. No.: 16/513,398

(22) Filed: Jul. 16, 2019

(65) Prior Publication Data
US 2020/0309251 A1 Oct. 1, 2020

(30) Foreign Application Priority Data
Mar. 25, 2019 (KR) .................. 10-2019-0033292

(51) Int. Cl.
| F16H 59/02 | (2006.01) |
| B60R 25/00 | (2013.01) |
| F16H 61/22 | (2006.01) |
| F16H 61/36 | (2006.01) |
| F16H 59/10 | (2006.01) |

(52) U.S. Cl.
CPC .......... *F16H 59/02* (2013.01); *B60R 25/007* (2013.01); *F16H 61/22* (2013.01); *F16H 61/36* (2013.01); *F16H 59/10* (2013.01); *F16H 2059/026* (2013.01)

(58) Field of Classification Search
CPC ... B60R 25/006; E05B 17/2007; E05B 17/20; E05B 17/2003; E05B 17/2084; E05B 17/2088; E05B 17/2092; E05B 2017/2096
See application file for complete search history.

(56) References Cited

U.S. PATENT DOCUMENTS

| 1,464,859 | A | * | 8/1923 | Witte | ............. | B60R 25/007 70/206 |
| 1,469,620 | A | * | 10/1923 | Carroll | ............. | B60R 25/007 70/201 |
| 1,572,145 | A | * | 2/1926 | Johnson | ............. | B60R 25/007 70/246 |
| 1,603,089 | A | * | 10/1926 | Martel | ............. | B60R 25/007 70/239 |
| 1,622,839 | A | * | 3/1927 | Peterson | ............. | B60R 25/007 70/248 |
| 1,692,668 | A | * | 11/1928 | Lach | ............. | B60R 25/007 70/245 |

(Continued)

*Primary Examiner* — Victor L MacArthur
*Assistant Examiner* — Gregory T Prather
(74) *Attorney, Agent, or Firm* — Morgan, Lewis & Bockius LLP

(57) ABSTRACT

An anti-theft device for a vehicle includes an approach prevention cover disposed in a shift lever housing to cover a shift cable connected to a shift lever so as to prevent the shift cable from being detached. Such an anti-theft vehicle makes is possible to easily and efficiently prevent theft of the vehicle by preventing a shift cable operated along with operation of a shift lever from being removed.

18 Claims, 10 Drawing Sheets

(56) References Cited

U.S. PATENT DOCUMENTS

| | | | | |
|---|---|---|---|---|
| 1,826,649 A * | 10/1931 | Briggs | B60R 25/007 | 70/248 |
| 1,827,732 A * | 10/1931 | Conlan | B60R 25/007 | 70/239 |
| 4,077,276 A * | 3/1978 | Knox, Jr. | B60K 17/344 | 70/203 |
| 4,418,583 A * | 12/1983 | Taig | F16C 1/226 | 192/111.11 |
| 4,584,857 A * | 4/1986 | Weber | B60R 25/02147 | 70/184 |
| 4,887,702 A * | 12/1989 | Ratke | B60R 25/02144 | 477/96 |
| 5,027,929 A * | 7/1991 | Ratke | B60R 25/02144 | 477/94 |
| 5,078,242 A * | 1/1992 | Ratke | B60R 25/02144 | 192/220.4 |
| 5,379,871 A * | 1/1995 | Asano | F16H 59/10 | 192/220.4 |
| 5,428,977 A * | 7/1995 | Knape | B60R 25/02144 | 477/99 |
| 5,492,031 A * | 2/1996 | Hedderly | B60K 20/06 | 200/61.27 |
| 5,785,626 A * | 7/1998 | Osborn | F16H 59/10 | 74/473.15 |
| 5,791,175 A * | 8/1998 | Van Wyk | B60R 25/066 | 70/237 |
| 11,187,320 B2 * | 11/2021 | Vermeersch | F16H 61/22 | |
| 2002/0002849 A1 * | 1/2002 | Syamoto | B60R 25/063 | 70/248 |
| 2004/0041689 A1 * | 3/2004 | DeBono | B60R 25/25 | 340/5.52 |
| 2004/0255712 A1 * | 12/2004 | Ruhlander | F16C 1/265 | 74/502.4 |
| 2009/0019902 A1 * | 1/2009 | Baranek | E05B 17/2092 | 70/237 |
| 2015/0135879 A1 * | 5/2015 | Jeong | F16H 59/10 | 74/473.36 |
| 2017/0175889 A1 * | 6/2017 | Shin | F16H 61/36 | |
| 2018/0244181 A1 * | 8/2018 | Keenan | B60N 3/002 | |
| 2019/0195340 A1 * | 6/2019 | Kim | F16H 59/0278 | |
| 2019/0316676 A1 * | 10/2019 | Jeong | B60R 25/066 | |
| 2020/0114870 A1 * | 4/2020 | Min | B60R 25/066 | |

\* cited by examiner

[FIG. 1]
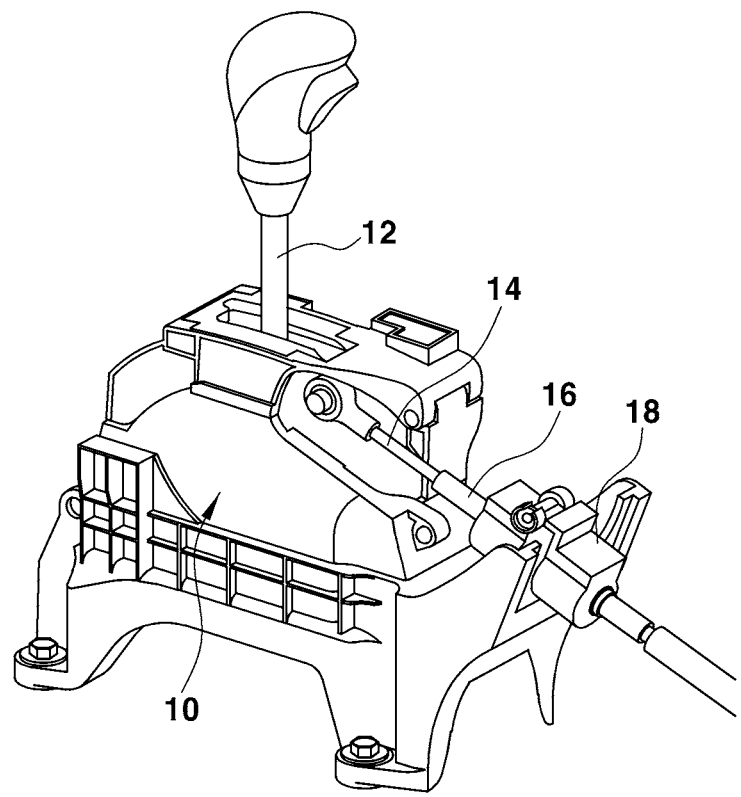
-PRIOR ART-

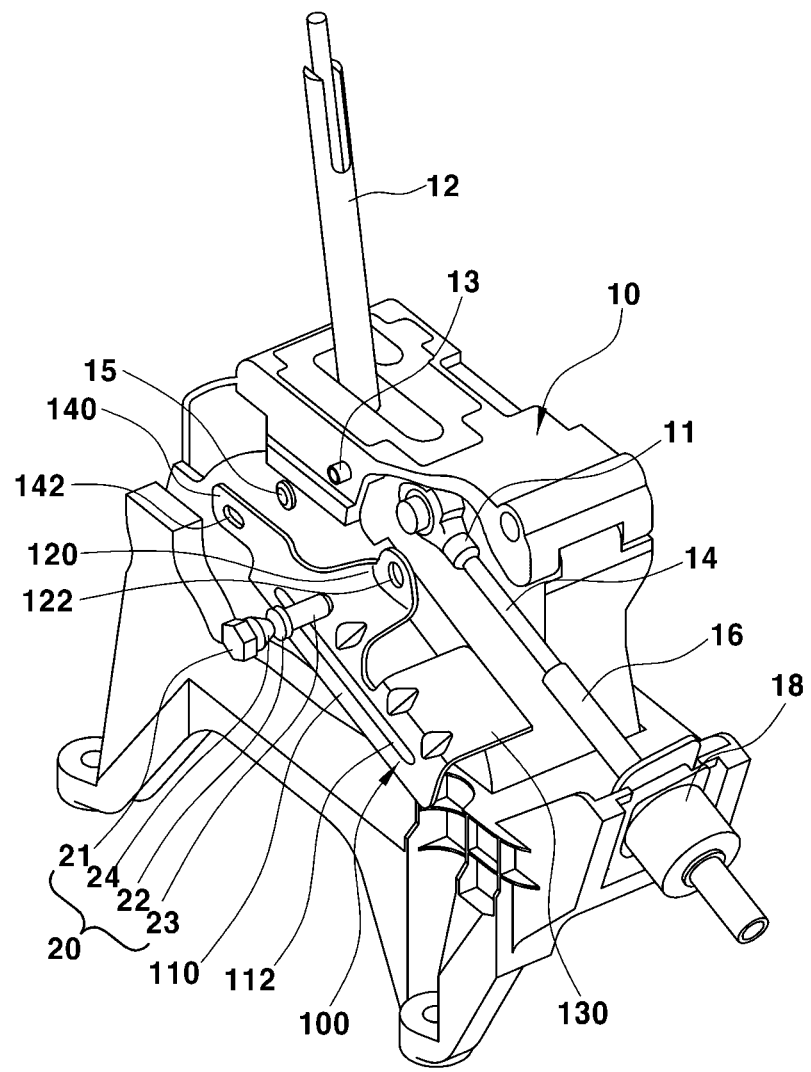
[FIG. 2]

[FIG. 3]
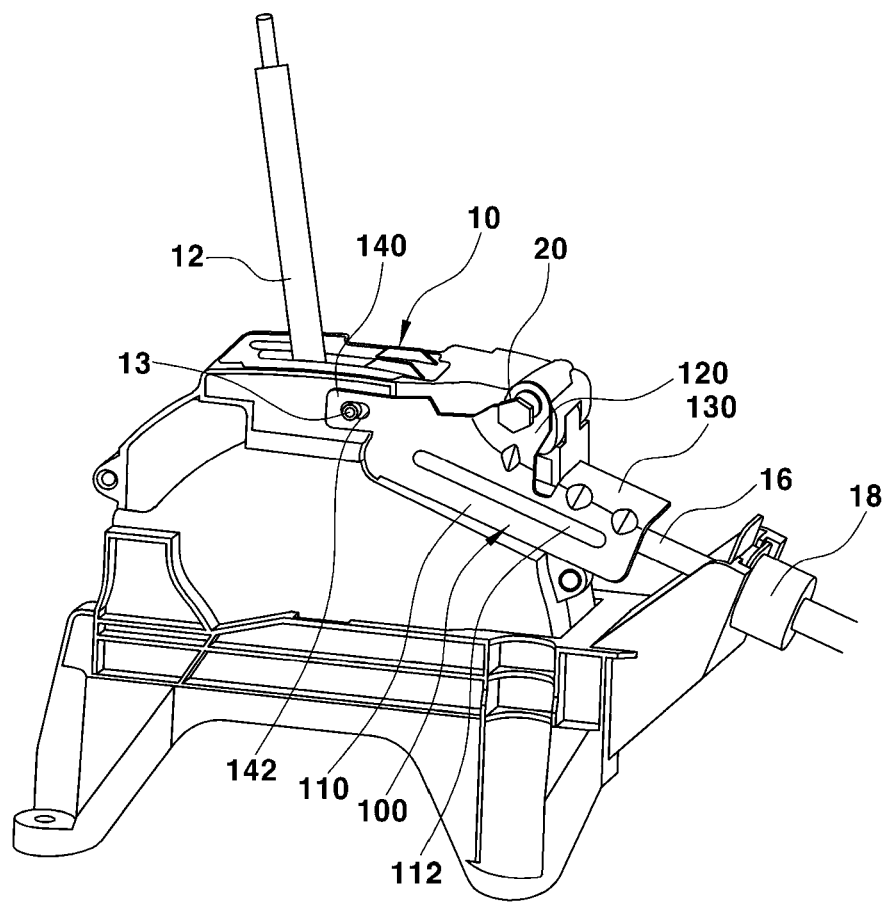

[FIG. 4]
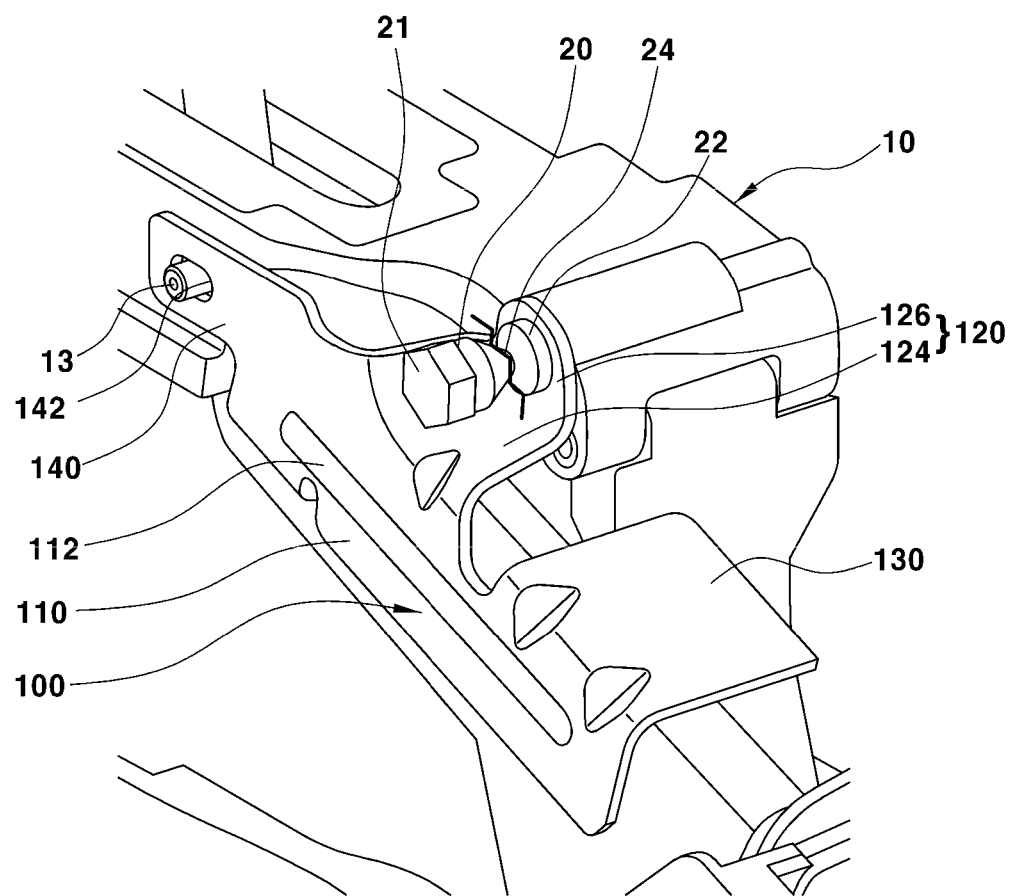

[FIG. 5]
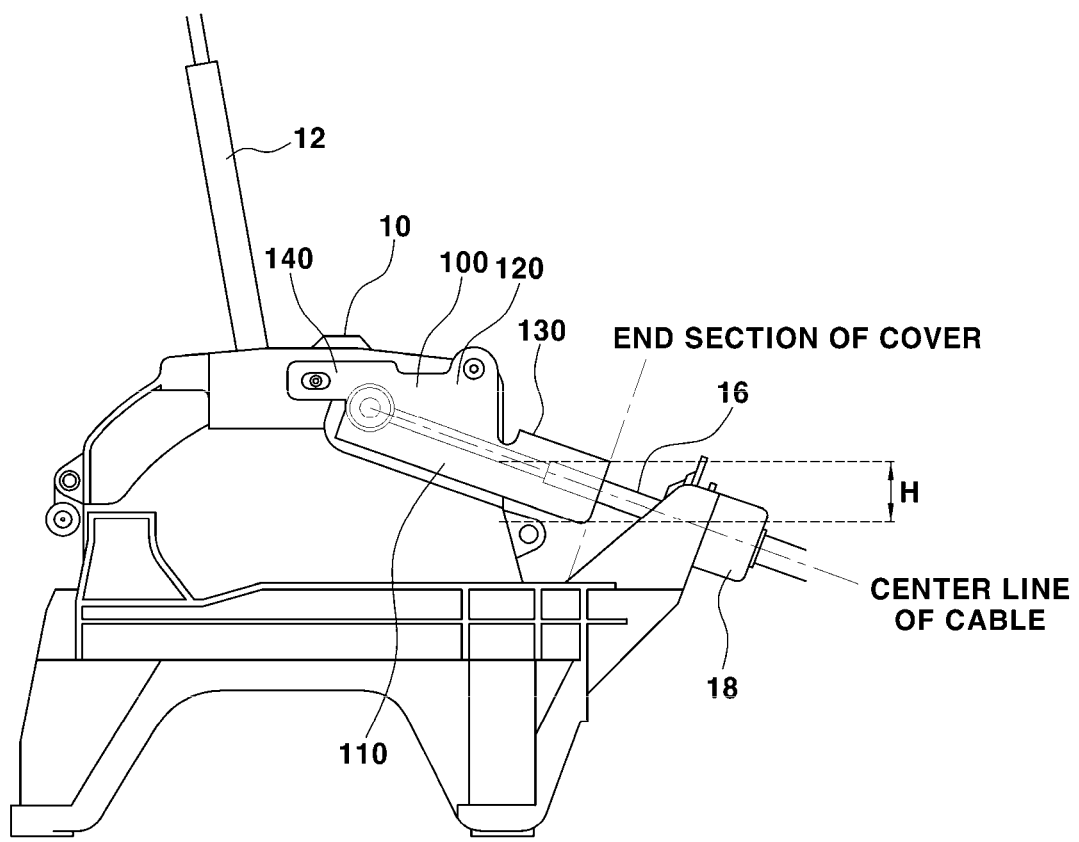

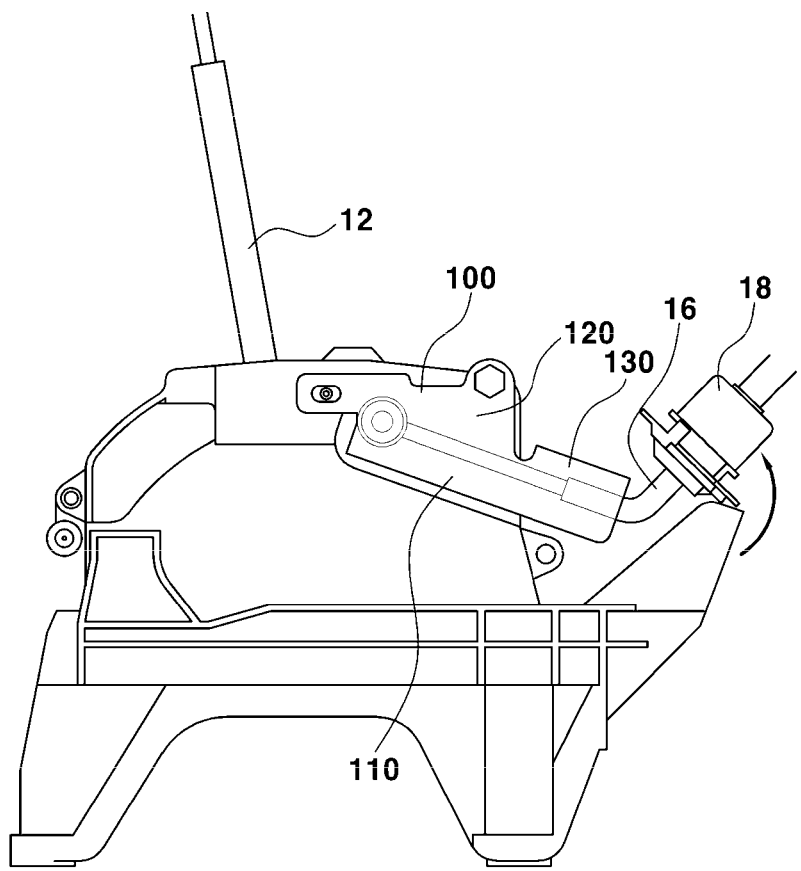
[FIG. 6]

[FIG. 7]
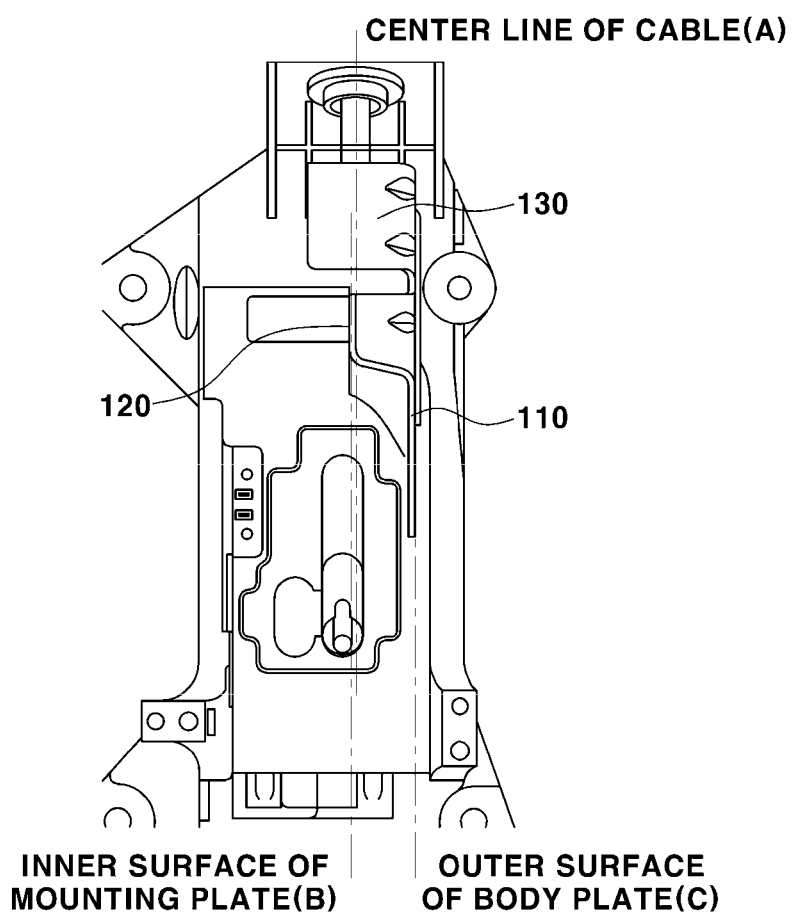

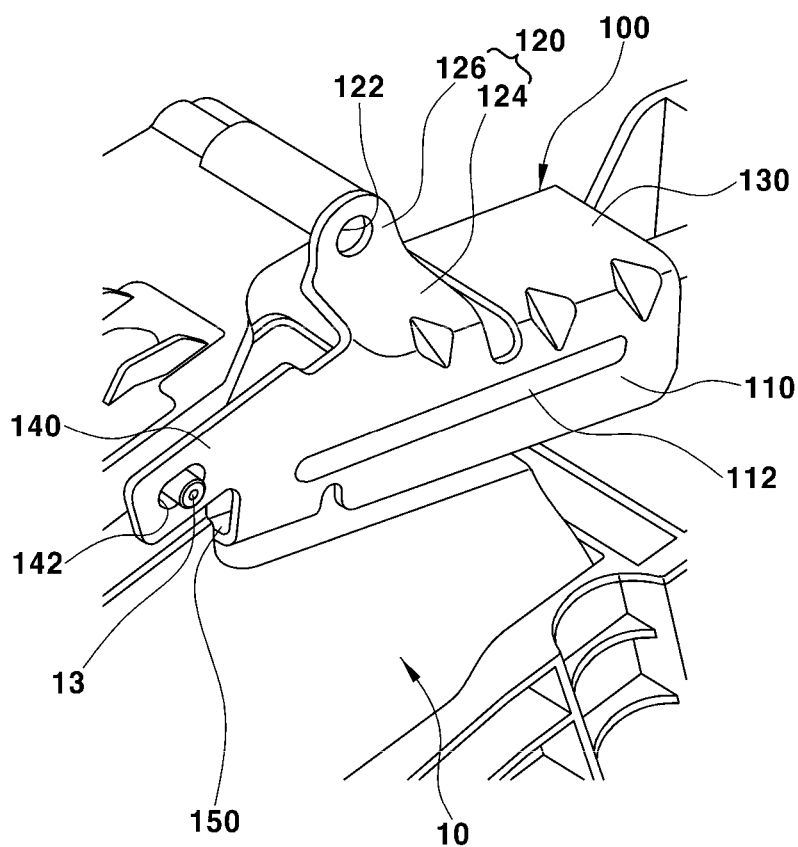
[FIG. 8]

[FIG. 9]
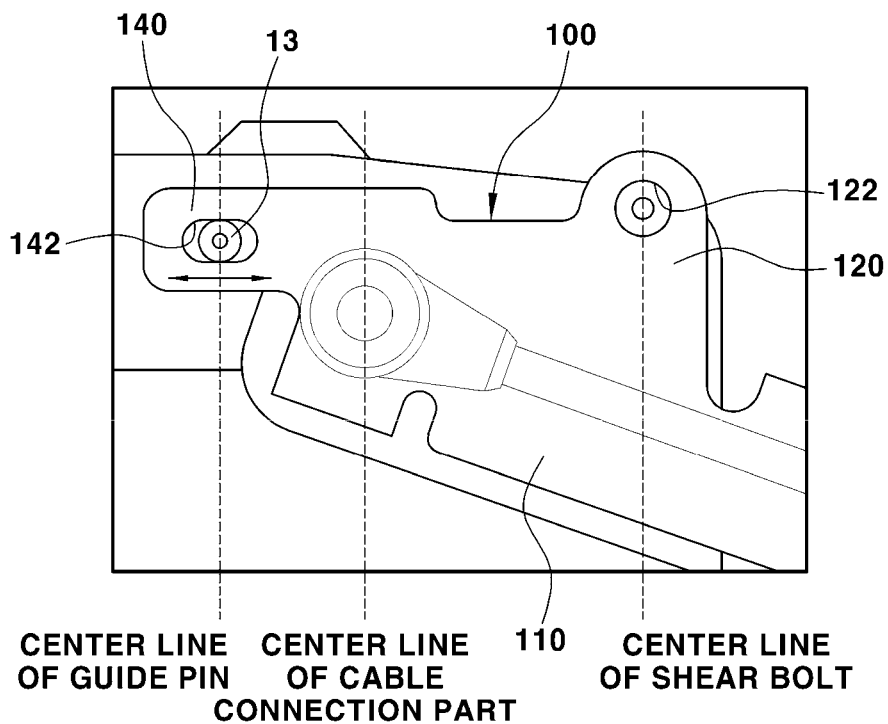

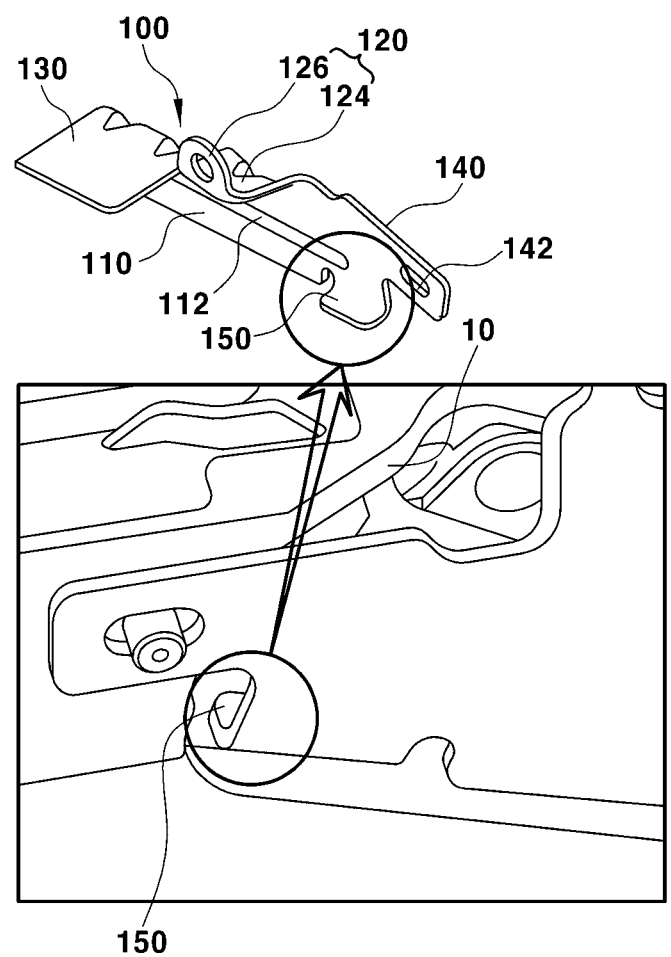
[FIG. 10]

ANTI-THEFT DEVICE FOR VEHICLE

CROSS REFERENCE TO RELATED APPLICATION

The present application claims priority to Korean Patent Application No. 10-2019-0033292 filed Mar. 25, 2019 in the Korean Intellectual Property Office, the entire contents of which is incorporated herein for all purposes by this reference.

TECHNICAL FIELD

The present disclosure relates to an anti-theft device for a vehicle, and more particularly, to an anti-theft device for a vehicle, in which vehicle theft can be easily and efficiently prevented by preventing a shift cable operated along with operation of a shift lever from being removed.

BACKGROUND

To prevent vehicle theft, anti-theft regulations have been applied to lock at least one of a steering system, a transmission, a shift lever, and a brake system so that they may not be easily removed.

As an example for satisfying the anti-theft regulations, an electric steering column lock (ESCL) is applied.

The ESCL is a device that allows a lock of the ESCL to be locked to a rotation shaft of a steering wheel while protruding when the vehicle is turned off, so that the vehicle is prevented from being forcibly steered.

The ESCL may prevent the steering wheel of the vehicle from being steered to prevent theft of the vehicle. However, since the ESCL is an electric type, the ESCL has a large number of components and a complicated structure, thereby increasing production cost and vehicle weight When the shift lever is changed from a P-stage position to an N-stage position, the vehicle becomes moveable and may not satisfy the anti-theft regulations. Therefore, the shift lever may be locked by a separate locking means.

However, even when the shift lever is locked by the separate locking means so as not to be moved, theft of the vehicle may occur through processes of exposing a shift cable by removing a console in the vehicle, of removing the shift cable connected to the shift lever from the shift lever, and of shifting from the P-stage to the N-stage by pulling the removed shift cable.

SUMMARY

The present disclosure has been made keeping in mind the above problems occurring in the related art, and the present disclosure is intended to propose an anti-theft device for the vehicle, in which a shift lever housing is provided with an approach prevention cover for covering a shift cable connected to a shift lever to prevent fundamentally the shift cable from being removed, so that vehicle theft can be easily and efficiently prevented.

According to one aspect of the present disclosure, an anti-theft device for a vehicle includes an approach prevention cover disposed in the shift lever housing to cover a shift cable connected to a shift lever so as to prevent the shift cable from being detached.

The approach prevention cover may include: a body plate for covering the shift cable connected to the shift lever; a mounting plate integrally provided at an upper part of the body plate and fastened to the shift lever housing; and an upper plate vertically bent upward from the rear part the body plate to cover the guide pipe guiding a movement of the shift cable.

On a surface of the body plate, a reinforcement line for increasing strength may be provided in a longitudinal direction of the body plate.

In addition, the mounting plate may be provided with a bolt insert hole, and the shift lever housing may be provided with a mounting hole.

The mounting plate may include: a horizontal plate bent in a horizontal direction from an upper part of the body plate to cover an upper part of the shift cable; and a vertical plate bent in a vertical direction from the horizontal plate to be in close contact with the mounting hole of the shift lever housing.

In addition, in order to mount the mounting plate in the shift lever housing, a shear bolt may be inserted into the bolt insert hole and the mounting hole that are aligned with each other.

The shear bolt may include: a head portion for applying torque; a round head portion having a diameter larger than a diameter of the bolt insert hole; a thread portion integrally provided at the round head portion and fastened to the mounting hole; and a break portion connecting the head portion for applying the torque and the round head portion and broken when at least a predetermined torque is applied thereto.

The approach prevention cover may further include a guide plate provided on a front end part of the body plate so as to guide the approach prevention cover to a mounting position with respect to the shift lever housing.

The guide plate may include a slot formed by penetrating the guide plate, and the shift lever housing may include a guide pin inserted into the slot of the guide plate.

A ring-shaped damper is fitted over the guide pin such that the ring-shaped damper is in close contact with an inner surface of the guide plate.

The approach prevention cover may further include a rotation preventing plate which is integrally provided on a lower end part of the body plate and bent toward the shift lever housing to be locked to a predetermined position of a wall of the shift lever housing.

Through the technical solution mentioned above, the present disclosure provides the following effects.

First, the shift lever housing is provided with the approach prevention cover for covering the shift cable connected to the shift lever to fundamentally prevent the shift cable from being removed, whereby theft of the vehicle can be easily and efficiently prevented.

Second, since the structure of the present disclosure is very simple in comparison with the conventional technique of locking the steering system using electric components such as an electric steering column lock (ESCL), the number of components and production cost can be reduced.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a perspective view showing a conventional shift lever housing in which a shift lever and a shift cable are installed.

FIGS. 2 to 4 are perspective views showing an anti-theft device for a vehicle according to the present disclosure.

FIG. 5 is a side view showing the anti-theft device for the vehicle according to the present disclosure.

FIG. 6 is a side view of the anti-theft device for the vehicle according to the present disclosure, which shows a state in which manipulation of a shift cable is impossible even when a socket is removed.

FIG. 7 is a plan view showing the anti-theft device for the vehicle according to the present disclosure.

FIG. 8 is an enlarged-perspective view showing an approach prevention cover of the anti-theft device for the vehicle according to the present disclosure.

FIG. 9 is a side view showing a state in which a connection part of the shift cable is covered with the approach prevention cover of the anti-theft device for the vehicle according to the present disclosure, and showing how an assembly error of the approach prevention cover is absorbed by a slot.

FIG. 10 is a perspective view showing a rotation preventing structure of the approach prevention cover of the anti-theft device for the vehicle according to the present disclosure.

DETAILED DESCRIPTION

Hereinbelow, an exemplary embodiment of the present disclosure will be described in detail with reference to the accompanying drawings.

FIG. 1 is a perspective view showing a conventional shift lever housing, and a reference numeral 10 in this drawing denotes a shift lever housing.

The shift lever housing 10 is a component exposed when a console is removed. The shift lever housing includes a shift lever 12 installed at an upper part thereof, and a shift cable 14 connected to and cooperating with the shift lever 12 that is connected to a side part of the shift lever housing 10.

A front end part of the shift cable 14 is jointed with the shift lever 12 at a side surface of the shift lever housing 10, and a rear end part thereof passes through a socket 18 provided at a rear part of the shift lever housing 10. A guide pipe 16 is integrally connected to a front end part of the socket 18 to guide linear movement of the shift cable 14.

As described above, vehicle theft may occur through processes of exposing the shift cable 14 by removing the console in the vehicle, of removing the shift cable 14 connected to the shift lever 12, and of shifting from a P-stage to an N-stage by pulling the removed shift cable 14.

Accordingly, the present disclosure is focused on a point in that the shift lever housing 10 is provided with an approach prevention cover 100 to cover the shift cable 14 connected to the shift lever 12 so that the shift cable 14 is prevented from being removed, thereby easily and efficiently preventing theft of the vehicle and complying with anti-theft regulations.

FIGS. 2 to 4 are perspective views showing an anti-theft device for a vehicle according to the present disclosure, and a reference numeral 100 in these drawings denotes the approach prevention cover.

The approach prevention cover 100 is installed on a side part of the shift lever housing 10, and is provided as a structure of covering the guide pipe 16 guiding the shift cable 14 and the linear movement of the shift cable 14.

According to an embodiment of the present disclosure, the approach prevention cover 100 has a structure integrally formed of a body plate 110 for covering the shift cable 14 and a connection part thereof, a mounting plate 120 integrally formed at an upper part of the body plate 110 and fastened to the side part of the shift lever housing 10, and an upper plate 130 vertically bent upward from a rear part of the body plate 110 and covering the guide pipe 16.

In order to prevent the approach prevention cover 100 from being deformed by an external force, a reinforcement line 112 for increasing strength protrudes from a surface of the body plate 110, and at least one reinforcement line 112 is provided along a longitudinal direction of the body plate 110.

The mounting plate 120 has a bolt insert hole 122, and the shift lever housing 10 has a mounting hole 11 so that the approach prevention cover 100 is installed on the side part of the shift lever housing 10.

Here, the mounting plate 120 of the approach prevention cover 100 may be formed according to a profile of the side part of the shift lever housing 10 so that the mounting plate 120 is easily attached to the side part of the shift lever housing 10.

Therefore, as shown in FIG. 8, the mounting plate 120 includes a horizontal plate 124 that is bent in a horizontal direction from the upper part of the body plate 110, a vertical plate 126 that is bent in a vertical direction from the horizontal plate 124 to be in close contact with a first side of the mounting hole 11 of the shift lever housing 10. In addition, the bolt insert hole 122 is provided on the vertical plate 126.

A shear bolt 20 is inserted into holes where the bolt insert hole 122 of the mounting plate 120 and the mounting hole 11 of the shift lever housing 10 are aligned with each other. Thus, the approach prevention cover 100 is installed on the side part of the shift lever housing 10.

The shear bolt 20 may include a head portion 21 for applying torque, the head portion having a hexagonal shape like a normal bolt head, a round head portion 22 having a diameter larger than a diameter of the bolt insert hole 122 of the mounting plate 120, and a thread portion 23 integrally provided on the round head portion 22 and inserted into the bolt insert hole 122 and the mounting hole 11.

The head portion 21 for applying torque and the round head portion 22 of the shear bolt 20 are integrally connected by a break portion 24 having a thin diameter. However, when at least a predetermined torque is applied to the head portion 21 for applying torque, the break portion 24 is broken and the head portion 21 is separated from the round head portion 22.

Accordingly, there is only the round head portion 22 on the mounting plate 120, and thus, the shear bolt 20 may not be released. Therefore, the approach prevention cover 100 cannot be removed from the shift lever housing 10 for theft.

A guide plate 140 is further integrally provided on a front end part of the body plate 110 so as to guide the approach prevention cover 100 to a mounting position with respect to the shift lever housing 10.

Particularly, the guide plate 140 is provided with a long slot 142 passing through the front and back of the guide plate 140, and the shift lever housing 10 has a guide pin 13 protruding to be inserted into the slot 142.

When the approach prevention cover 100 is installed on the side part of the shift lever housing 10 by inserting the guide pin 13 into the slot 142 of the guide plate 140, the mounting position of the approach prevention cover 100 may be precisely specified.

In addition, since the slot 142 provided on the guide plate 140 has a long length in a left and right direction as shown in FIG. 9, an assembly tolerance of the approach prevention cover 100 may be absorbed therein.

That is, when the approach prevention cover 100 is moved back and forth within the length of the slot 142 with the guide pin 13 inserted into the slot 142, the bolt insert hole 122 of the mounting plate 120 may be exactly aligned with the mounting hole 11 of the shift lever housing 10. Therefore, the approach prevention cover 100 can be precisely bolted to a pre-set mounting position at the shift lever housing 10.

Here, as the guide plate 140 of the approach prevention cover 100 is directly contacted with the side surface of the shift lever housing 10, a joint caused by metal contact friction may occur.

In order to solve this problem, a ring-shaped damper 15 is fitted over the guide pin 13 such that the ring-shaped damper 15 is in close contact with an inner surface of the guide plate 140. Thus, direct contact between the guide plate 140 and the shift lever housing 10 is prevented by the damper 15 so that the joint caused by the metal contact friction may be prevented.

In the present disclosure, the approach prevention cover 100 further includes a rotation preventing plate 150 integrally provided on a lower end part of the body plate 110, as shown in FIG. 10. The rotation preventing plate 150 is bent toward the shift lever housing 10 to be locked to a predetermined position of a wall of the shift lever housing 10.

Accordingly, even when the guide pin 13 of the shift lever housing 10 is forcibly removed from the slot and then the approach prevention cover 100 is forcibly rotated upward for removal, the approach prevention cover 100 is efficiently prevented from being rotated because the rotation preventing plate 150 is locked to an uneven part formed at the wall of the shift lever housing 10.

As described above, the guide pin 13 of the shift lever housing 10 is inserted into the slot 142 provided on the guide plate 140 of the approach prevention cover 100, and the bolt insert hole 122 provided on the mounting plate 120 is precisely aligned with the mounting hole 11 of the shift lever housing 10. Then, the shear bolt 20 is inserted into the bolt insert hole 122 and mounting hole 11 that are aligned together, and the head portion 21 for applying torque of the shear bolt 20 is broken. As a result, installation of the approach prevention cover 100 on the side part of the shift lever housing 10 is completed.

As shown in the plan view of FIG. 7, when a center line A of the shift cable is positioned to the right of an inner surface B of the mounting plate 120 in which the shear bolt is installed, an upper part of the shift cable 14 is easily and efficiently covered. In addition, an outer surface C of the body plate 110 may be positioned sufficiently farther from center line A of the shift cable in consideration of providing an operation space of the shift cable 14.

Therefore, the body plate 110 and the mounting plate 120 of the approach prevention cover 100 cover the shift cable 14 and the connection part thereof, and the upper plate 130 covers an upper part of the guide pipe 16. As shown in FIG. 5, since the center line A of the shift cable is included in a height H formed by an end section of the approach prevention cover 100, approach to the shift cable 14 is impossible, and theft of the vehicle by the manipulation of the shift cable can be fundamentally prevented.

Even when the approach prevention cover 100 is installed in the shift lever housing 10, when the socket 18 provided at the rear part of the shift lever housing 10 is not covered, the socket 18 may be lifted and forcibly removed for the purpose of theft of the vehicle.

However, even when the socket 18 is forcibly lifted, the guide pipe 16 integrally formed at the front end part of the socket 18 is bent upward while being locked to the upper plate 130 of the approach prevention cover 100 as shown in FIG. 6. Accordingly, since manipulation to pull the shift cable 14 in the guide pipe 16 or the like is impossible, theft of the vehicle by manipulation of the shift cable can be fundamentally prevented.

What is claimed is:

1. An anti-theft device for a vehicle, the anti-theft device comprising:
    an approach prevention cover disposed on a shift lever housing to cover a shift cable connected to a shift lever so as to prevent the shift cable from being detached,
    wherein the approach prevention cover is installed on an outer side part of the shift lever housing by tightening a shear bolt, the outer side part of the shift lever housing facing away from the shift lever,
    wherein the approach prevention cover includes:
        a body plate for covering the shift cable connected to the shift lever; and
        a mounting plate connected with an upper part of the body plate and fastened to the shift lever housing,
    wherein an eye end of the shift cable is assembled to the shift lever in a lateral direction of the shift lever housing,
    wherein the mounting plate has a bolt insert hole, and the shift lever housing has a mounting hole, and
    wherein, to mount the mounting plate to the shift lever housing, the shear bolt is inserted, in the lateral direction, into the bolt insert hole and the mounting hole that are aligned with each other.

2. The anti-theft device of claim 1, wherein the approach prevention cover further includes:
    an upper plate integrally connected with a rear part of the body plate and covering a guide pipe for guiding a movement of the shift cable.

3. The anti-theft device of claim 2, wherein the upper plate is bent from the rear part of the body plate so as to cover an upper part of the guide pipe.

4. The anti-theft device of claim 1, wherein the shear bolt is arranged close to the eye end of the shift cable.

5. The anti-theft device of claim 1, wherein, on a surface of the body plate, a reinforcement line for increasing strength is formed in a longitudinal direction of the body plate.

6. The anti-theft device of claim 1, wherein the mounting plate includes:
    a horizontal portion bent in a horizontal direction from the upper part of the body plate to cover an upper part of the shift cable; and
    a vertical portion bent in a vertical direction from the horizontal portion to be in contact with the mounting hole of the shift lever housing.

7. The anti-theft device of claim 1, wherein the shear bolt includes:
    a drive head portion for applying torque;
    a round head portion having a diameter larger than a diameter of the bolt insert hole;
    a thread portion integrally connected to the round head portion and fastened to the mounting hole; and
    a break portion connecting the drive head portion for applying the torque and the round head portion and broken when at least a predetermined torque is applied thereto.

8. The anti-theft device of claim 1, wherein the approach prevention cover further includes:
    a guide plate disposed on a front end part of the body plate so as to guide the approach prevention cover to a mounting position with respect to the shift lever housing.

9. The anti-theft device of claim 8, wherein the guide plate includes a slot penetrating the guide plate, and the shift lever housing includes a guide pin disposed inside the slot of the guide plate.

10. The anti-theft device of claim 9, wherein a ring-shaped damper is fitted over the guide pin such that the ring-shaped damper is in contact with an inner surface of the guide plate.

11. The anti-theft device of claim 1, wherein the approach prevention cover further includes:
   a rotation preventing plate which is integrally connected to a lower end part of the body plate and bent toward the shift lever housing to be locked in a predetermined position at a wall of the shift lever housing.

12. An anti-theft device for a vehicle, the anti-theft device comprising:
   an approach prevention cover disposed on a shift lever housing to cover a shift cable connected to a shift lever so as to prevent the shift cable from being detached,
   wherein the approach prevention cover includes:
      a body plate for covering the shift cable connected to the shift lever; and
      a mounting plate connected with an upper part of the body plate and fastened to the shift lever housing,
   wherein the shift cable includes an eye end that is assembled to the shift lever,
   wherein the mounting plate has a bolt insert hole, and the shift lever housing has a mounting hole,
   wherein, to mount the mounting plate to the shift lever housing, a shear bolt is inserted into the bolt insert hole and the mounting hole that are aligned with each other, and
   wherein a direction in which the shear bolt is inserted into the bolt insert hole and the mounting hole and a direction in which the eye end of the shift cable is assembled to the shift lever are substantially equal to each other.

13. The anti-theft device of claim 12, wherein the approach prevention cover further includes
   an upper plate integrally connected with a rear part of the body plate and covering a guide pipe for guiding a movement of the shift cable,
   wherein the upper plate is bent from the rear part of the body plate so as to cover an upper part of the guide pipe.

14. The anti-theft device of claim 12, wherein, on a surface of the body plate, a reinforcement line for increasing strength is formed in a longitudinal direction of the body plate.

15. The anti-theft device of claim 12, wherein the mounting plate includes:
   a horizontal portion bent in a horizontal direction from the upper part of the body plate to cover an upper part of the shift cable; and
   a vertical portion bent in a vertical direction from the horizontal portion to be in contact with a mounting hole of the shift lever housing.

16. The anti-theft device of claim 12, wherein the shear bolt includes:
   a drive head portion for applying torque;
   a round head portion having a diameter larger than a diameter of the bolt insert hole;
   a thread portion integrally connected to the round head portion and fastened to the mounting hole; and
   a break portion connecting the drive head portion for applying the torque and the round head portion and broken when at least a predetermined torque is applied thereto.

17. The anti-theft device of claim 12, wherein the approach prevention cover further includes:
   a guide plate disposed on a front end part of the body plate so as to guide the approach prevention cover to a mounting position with respect to the shift lever housing.

18. The anti-theft device of claim 12, wherein the shear bolt is arranged close to the eye end of the shift cable.

* * * * *